UNITED STATES PATENT OFFICE.

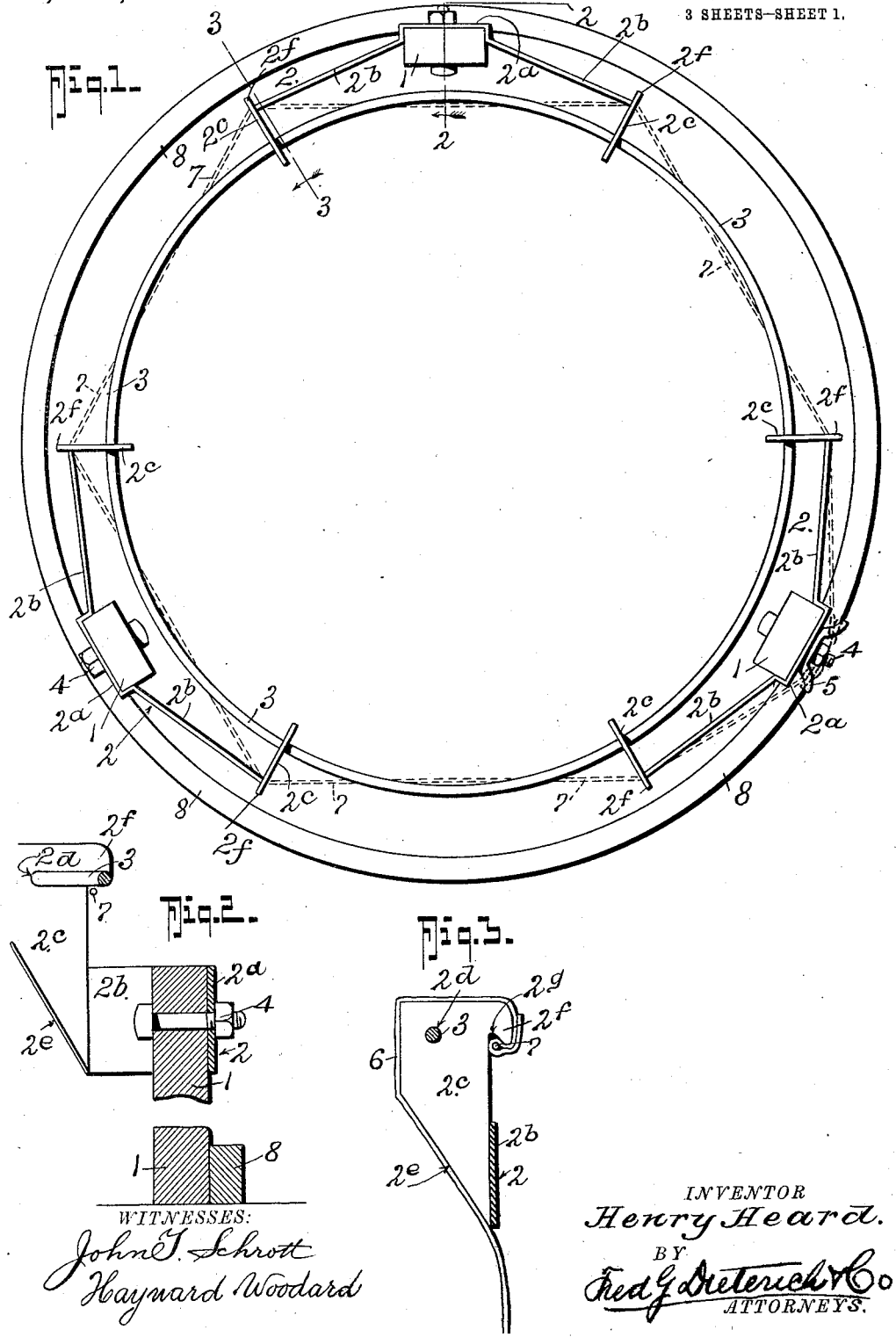

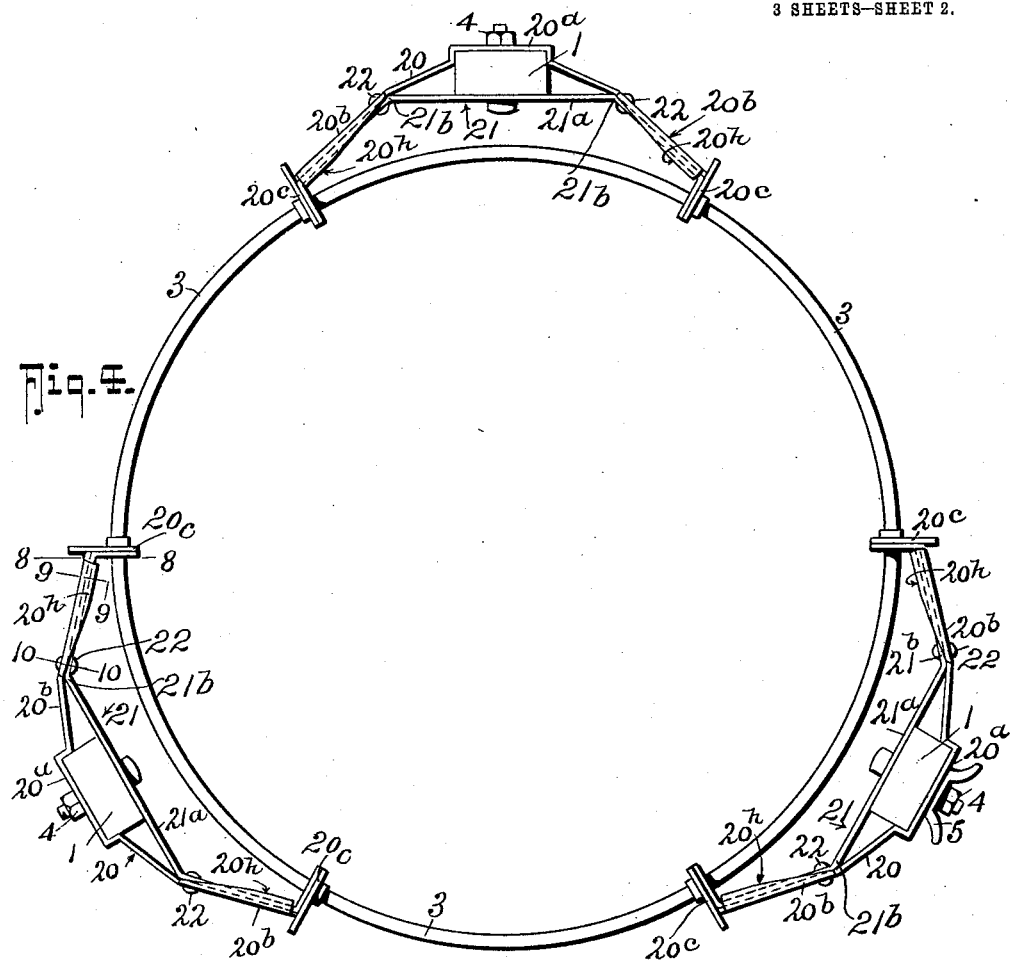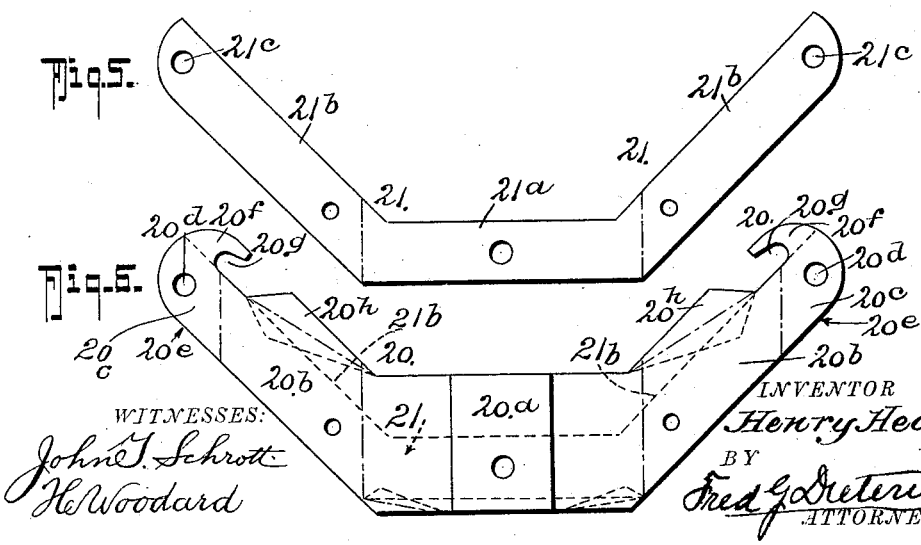

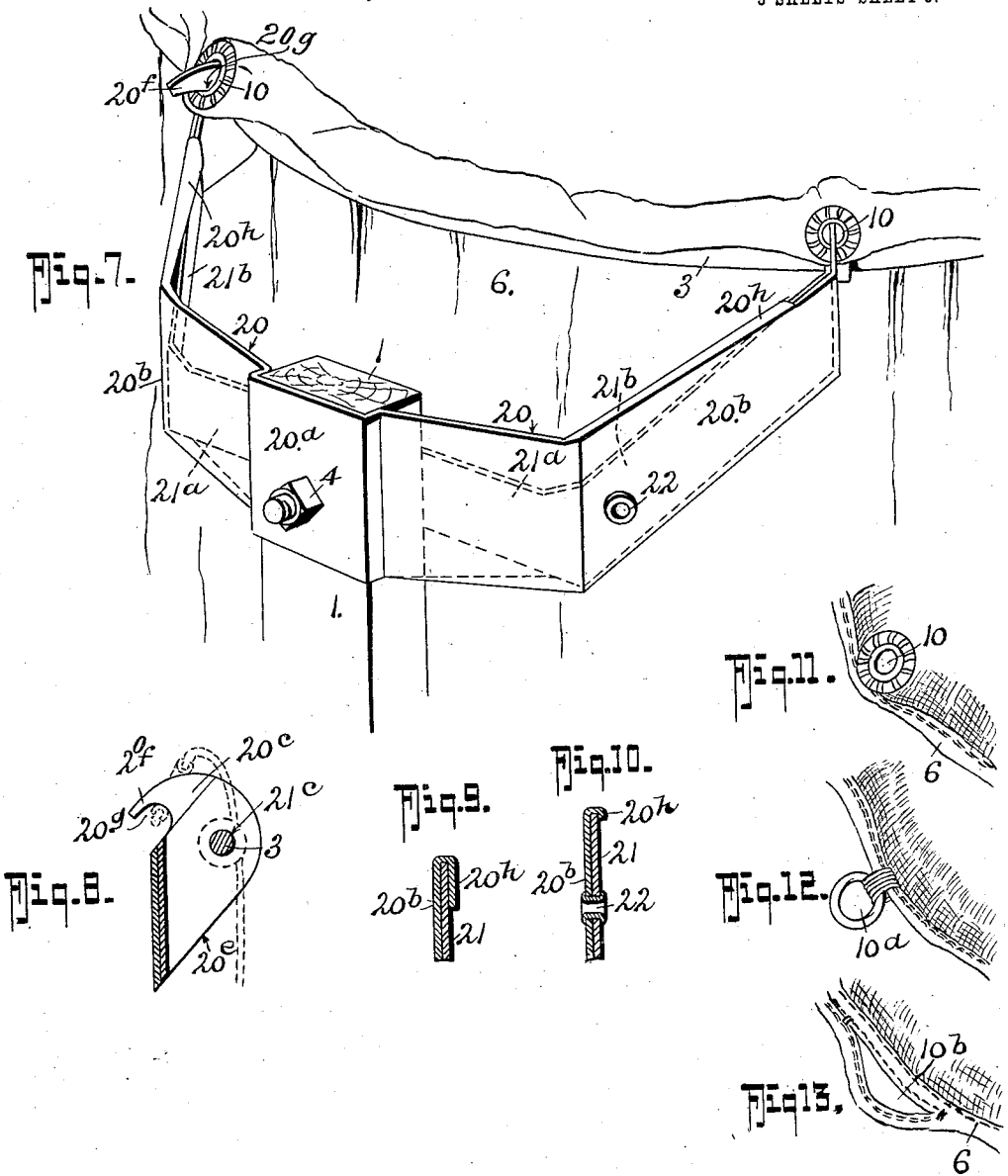

HENRY HEARD, OF UNION POINT, GEORGIA.

HARVESTING-SACK SUPPORTER.

1,082,695.

Specification of Letters Patent.   Patented Dec. 30, 1913.

Application filed July 13, 1910.   Serial No. 571,741.

*To all whom it may concern:*

Be it known that I, HENRY HEARD, residing at Union Point, in the county of Greene and State of Georgia, have invented certain new and useful Improvements in Harvesting-Sack Supporters, of which the following is a specification.

My invention is an improved holder designated more particularly as the supporter for harvesting sacks and the like, and in its generic nature the invention resides in providing a holder formed of a plurality of supporting posts each carrying a frame of a construction to support a mouth ring over which the mouth of a sack is folded and tied, and each including members under which the draw-string of the sack is adapted to rest when the sack is in place.

More specifically the invention also consists in those novel constructions, combinations and arrangement of parts, all of which will be first fully described, then be specifically pointed out in the appended claims, and illustrated in the accompanying drawings, in which:

Figure 1, is a top plan view of one form of my invention. Fig. 2, is a detail vertical section on the line 2—2 of Fig. 1. Fig. 3, is a similar section on the line 3—3 of Fig. 1, the sack being in place. Fig. 4, is a top plan view of another form of the invention. Figs. 5 and 6, are elevations of the two frame members. Fig. 7, is a detail perspective view of a part of the invention. Fig. 8, is a detail section on the line 8—8 of Fig. 4. Fig. 9, is a detail section on the line 9—9 of Fig. 4. Fig. 10, is a detail section on the line 10—10 of Fig. 4. Figs. 11 to 13 inclusive are detail views of parts of a sack mouth showing the different means for engaging the frame hooks.

Referring now to the accompanying drawings in which like letters and numerals of reference indicate like parts in all of the figures, 1 designates the supporting legs of which there may be two or more, three being shown in the drawings for purposes of illustration as may be desired, and the legs may be joined at the bottom (preferably when two legs are used) by a ring 8, to form a base, or when three or more legs 1 are used the ring 8 may be omitted.

In the form shown in Figs. 1 to 3, a frame 2 is secured to the legs 1 and the frames 2 carry the mouth ring or hoop 3. Each frame 2 comprises a substantially U-shaped central supporting part $2^a$ from which the diverging arms $2^b$ project. The arms $2^b$ carry radially disposed wings $2^c$ each of which has its underside cut away on a downwardly and outwardly directed bevel, as at $2^e$, to allow for bulging of the sack and each has a hole $2^d$ to receive the ring or hoop 3, over which the sack mouth is folded at times. Each wing 2 on its outer edge above the arm $2^b$, has a hook-like finger $2^f$ forming a notch $2^g$ into which the draw-string 7 of the sack 6 is seated, see Fig. 4. The frames 2 are secured to the legs 1 by bolts and nuts 4 that pass through the U-shaped portion $2^a$ of the frames 2, a cleat or cleats 5 are secured to one of the legs 1, to which the draw-string 7 of the sack may be secured.

In the form of the invention shown in Figs. 4 to 10 inclusive, the ring 8 is not shown as it may be omitted and the frames 20 are of a slightly different construction from those shown in Fig. 1, in that each frame 20 is composed of two members, the outer one of which having a central supporting part $20^a$ from which the upwardly projected and diverging arms $20^b$ project. The arms $20^b$ having radially disposed wings $20^c$ each of which has its under side cut away on a downwardly and outwardly directed bevel, as at $20^e$ to allow for bulging of the sack. Each wing $20^c$ has a hole $20^d$ for the ring 3, over which the mouth of the sack is held. The wings $20^c$ each have hooks or fingers $20^f$ to leave a notch $20^g$ into which the draw-string of the sack may be slipped, as shown in the forms illustrated in Fig. 1, or when the sack has eyelets 10—$10^a$—$10^b$ (see Figs. 11 to 13) the eyelets may be simply placed over the hooks $20^f$, as shown in Fig. 7, to hold the sack in place with its mouth open. The arms $20^b$ have bendable portions $20^h$ to be bent over the inner frame members 21 and clasp the same. The member 21 has a central body portion $21^a$ and arms $21^b$ and is also secured to the outer member by rivets 22. The member 21 is further provided with holes $21^c$ for the ring 3, as shown. The frame 20 is secured to the legs 1 by bolts and nuts 4 with the legs 1 held between the two frame members.

In practice the sack is inserted into the holder and the mouth of the sack folded over as shown in Fig. 3 of the drawings, the draw-string being drawn sufficiently tight to hold the sack in place.

From the foregoing description taken in connection with the accompanying drawings, it is thought the complete construction, operation and advantages of my invention will be readily understood by those skilled in the art to which the invention appertains.

What I claim is:

1. In a bag or holder, a plurality of legs, a frame secured to each leg and comprising a central leg engaging body and arms projecting therefrom, radial wings carried by said arms, a ring passing through apertures in said wings and supported by said wings and over which a sack mouth may be tied.

2. In a bag or holder, a plurality of legs, a frame secured to each leg and comprising a central leg engaging body, and arms projecting therefrom, inwardly projecting radial wings carried by said arms, a ring passing through apertures in said wings and supported by said wings and over which a sack mouth may be tied, said wings each having their lower edge beveled cut, all of said bevel cut portions facing inwardly to allow for bulging of the bag or sack.

3. In a bag or holder, a plurality of legs, a frame secured to each leg and comprising a central leg engaging body, and arms projecting therefrom, radial wings carried by said arms, a ring passing through apertures in said wings and supported by said wings and over which a sack mouth may be tied, said wings having outwardly projected fingers beneath which the draw-string of the sack may be tied.

4. In a sack supporter, a leg or support, a frame secured thereto and composed of a pair of members each having a body and arm portions, said frame having radial wings provided with hooks, means for securing said frame members together, means for securing said frame members to said leg with the leg between the frame members and a sack supporting ring carried by said frame.

5. A sack holder that includes legs, ring carrying frames supported thereby, said frames including two members, said members having body portions and arm portions and terminating in radial wings having holes, a ring held in said holes, means for securing said frame members to said legs, and means on said frame members for engaging a sack mouth to hold it open.

6. A sack holder that includes legs, ring carrying frames supported thereby, said frames including two members, said members having body portions and arm portions and terminating in radial wings having holes, a ring held in said holes, means for securing said frame members to said legs, means on said frame members for engaging a sack mouth to hold it open, one of said frame members having portions bent over the other frame member to clasp the same.

HENRY HEARD.

Witnesses:
M. M. Cox,
W. A. Wagnon.

---

Copies of this patent may be obtained for five cents each, by addressing the "Commissioner of Patents, Washington, D. C."